United States Patent [19]

Nahay

[11] 4,037,065
[45] July 19, 1977

[54] 20 Hz RINGDOWN SOLID STATE TWO-WIRE/FOUR-WIRE CONVERTER

[75] Inventor: Lawrence P. Nahay, Cinnaminson, N.J.

[73] Assignee: The United States of America as represented by the Secretary of the Navy, Washington, D.C.

[21] Appl. No.: 729,508

[22] Filed: Oct. 4, 1976

[51] Int. Cl.² .............................................. H04B 1/58
[52] U.S. Cl. .............................................. 179/170 NC
[58] Field of Search ............. 179/81 B, 170 R, 170 D, 179/170 T, 170 NC

[56] References Cited

U.S. PATENT DOCUMENTS

| 3,530,260 | 9/1970 | Gaunt, Jr. | 179/170 NC |
| 3,855,430 | 12/1974 | Colardelle et al. | 179/170 NC |
| 3,973,089 | 8/1976 | Puckette | 179/170 NC |

FOREIGN PATENT DOCUMENTS

| 2,450,853 | 4/1975 | Germany | 179/170 NC |

OTHER PUBLICATIONS

M. A. Patten; "Electronic Hybrid Telephone Line Pack;" IBM Tech. Disclosure Bulletin; vol. 16, No. 4; Sept. 1973; pp. 1173-1174.

Primary Examiner—Kathleen H. Claffy
Assistant Examiner—Randall P. Myers
Attorney, Agent, or Firm—Richard S. Sciascia; Arthur A. McGill; Prithvi C. Lall

[57] ABSTRACT

A hybrid system utilizing a plurality of operational amplifiers provides for appropriate isolation of input and output signalling. A signal initially appearing at the incoming path of the four-wire line appears as a balanced signal at the two-wire input/output end of the system but is effectively canceled from appearing at the ouput path of the four-wire input/output end. A signal initially placed on the two-wire input/output end of the system appears at the output of the four-wire input/output end but is effectively canceled from the input line of the four-wire input/output end. A 20 Hz threshold detector senses signals from the two-wire input/output line.

4 Claims, 1 Drawing Figure

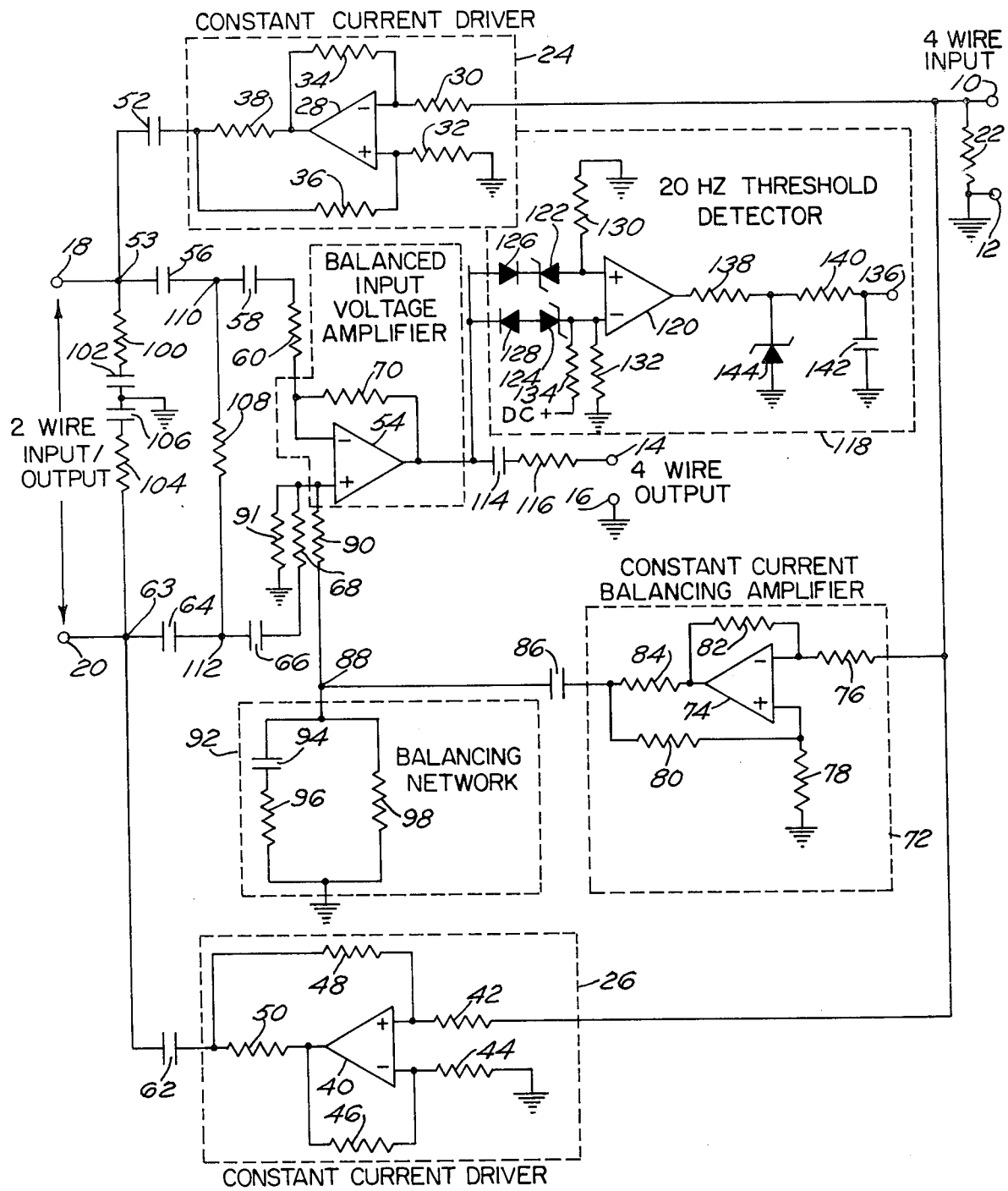

20 Hz RINGDOWN SOLID STATE TWO-WIRE/FOUR-WIRE CONVERTER

BACKGROUND OF THE INVENTION

The present invention generally relates to communication systems and more particularly to a hybrid circuit utilizing a 20 Hz threshold detector in which the hybrid circuit provides conduction or isolation between selected paths of two-wire and four-wire lines.

Hybrid systems are well known in the communication field. They are used to connect a two-wire bidirectional balanced transmission path with a four-wire path. If the hybrid system does not have proper canceling parameters, undesirable signals appear on specified lines. For instance, at the four-wire input/output terminals, a signal introduced to the hybrid system at the input terminals must not appear at the output terminals. Furthermore, a signal introduced to the hybrid system at the two-wire input/output terminal must appear at the output terminals but not at the input terminals of the four-wire input/output. The purpose of the system is to have the signals introduced to the system on the input terminals of the four-wire input/output end transmitted only to the two-wire input/output end and the signals introduced at the two-wire input/output end transmitted only to the two output lines of the four-wire input/output end. In a system providing 20 Hz signalling at the two-wire end, isolation is provided from both the input and output of the four-wire end.

Special balancing transformers and more recently solid state devices have been used to provide the appropriate canceling. None of the prior art, however, have accomplished a system as effectively simplistic and capable of miniaturization as the present invention.

SUMMARY OF THE INVENTION

Accordingly, it is a general object and purpose of the present invention to provide an improved hybrid system. Further objects are that the system be reliable, low in cost and adaptable for miniaturization. These and other objects of the invention and the various features and details of construction and operation will become apparent from the specification and drawing.

This is accomplished in acccordance with the present invention by providing a transformless two-wire/four-wire converter circuit using solid state operational amplifiers. The two-wire interface is a balanced termination which provides for simultaneous bidirectional transmission over a balanced transmission wire pair. The four-wire input and output interfaces are shown as single ended terminations. These can be readily converted to balanced circuits using conventional techniques.

A pair of solid state current drivers are provided for receiving the four-wire input signal. The first is driven in a non-inverting manner while the second operates in an inverted manner. This provides balanced push-pull output signals. A balancing amplifier used in conjunction with an appropriate balancing network cancels signals from the four-wire input from appearing at the four-wire output.

An operational amplifier receives the two-wire input signal. The output of this amplifier provides the signal to the four-wire output and also to a 20 Hz threshold detector.

BRIEF DESCRIPTION OF THE DRAWING

The FIGURE is a schematic representation of a 20 Hz ringdown, solid state two-wire/four-wire converter.

DESCRIPTION OF THE PREFERRED EMBODIMENT

Referring now to the FIGURE there is shown the four-wire input/output terminals, with respective numerals 10 and 12 representing the input terminals, and 14 and 16 denoting the output terminals. Numerals 18 and 20 represent the balanced two-wire input/output terminals.

An impedance 22 is connected at the four-wire input between terminal 10 and grounded terminal 12. Constant current drivers 24 and 26 are connected to input terminal 10. Driver 24 is an inverting device comprised of operational amplifier 28, and associated resistors 30, 32, 34, 36 and 38. An input signal from terminal 10 is supplied to the negative terminal of the operational amplifier 28. Driver 26 is a non-inverting device comprised of operational amplifier 40, and associated resistors 42, 44, 46, 48 and 50. An input signal from terminal 10 is supplied to the positive terminal of the operational amplifier 40.

The output of driver 24 is connected to the two-wire input/ output terminal 18 through capacitor 52 and junction point 53. The output of driver 24 is also connected to the negative terminal of operational amplifier 54 through capacitor 52, junction 53, capacitors 56 and 58, and resistor 60. The output of driver 26 is connected to two-wire input/output terminal 20 through capacitor 62 and junction point 63. The output of driver 26 is also connected to the positive terminal of operation amplifier 54 through capacitor 62, junction 63, capacitors 64 and 66, and resistor 68. Operational amplifier 54 has a feedback resistor 70.

A constant current balancing amplifier 72 receives an input signal from terminal 10. Balancing amplifier 72 is comprised of operational amplifier 74, and associated resistors 76, 78, 80, 82 and 84. The output of amplifier 72 is connected to the positive input terminal of amplifier 54 through capacitor 86, junction point 88 and resistor 90. The positive input terminal of amplifier 54 is grounded through a resistor 91. Terminal 88 is connected to ground through balancing network 92 comprised of capacitor 94 and resistor 96 connected in parallel with resistor 98.

A center tap ground is provided on the two-wire input/ output terminals 18 and 20. Terminal 18 is grounded through resistor 100 and capacitor 102, and terminal 20 is grounded through resistor 104 and capacitor 106. A resistor 108 is connected to a junction 110 located between capacitors 56 and 58, and to junction 112 connected between capacitors 64 and 66.

The output of amplifier 54 is connected to output terminal 14 through capacitor 114 and resistor 116. A 20 Hz threshold detector circuit 118 is also connected to the output side of amplifier 54. Detector 118 is comprised of an operational amplifier 120 connected from its respective positive and negative input terminals to zener diodes 122 and 124 which are arranged in phase opposition to each other. A first diode 126 is serially connected between amplifier 54 and zener diode 122. A second diode 128 is serially connected between amplifier 54 and zener diode 124. The two diodes 126 and 128 are connected in phase opposition to each other with the anode of diode 126 and the cathode of diode 128 connected to amplifier 54. Grounding resistors 130 and 132 are connected to respective positive and negative input terminals of amplifier 120. A positive D.C. bias is supplied through a resistor 134 to the negative input terminal of amplifier 120. The output of amplifier 120 is connected to detector output terminal 136 through serially connected resistors 138 and 140. The terminal 138 has an A.C. ground provided by capacitor 142. A zener diode 144 for regulating the voltage signal to terminal 136 is connected to ground from a junction point between resistors 138 and 140.

In the operation of the system, a signal received at terminal 10 is supplied to constant current drivers 24 and 26. This results in a balanced signal being received on terminals 18 and 20. This would also tend to supply a balanced signal to amplifier 54 resulting in an undesired transmission of the signal to terminal 14. However, the signal applied to terminal 10 is also supplied to inverting amplifier 72 and this amplifier 72 in conjunction with balancing network 92 and associated resistors results in the signal being applied to the positive terminal of amplifier 54 being equal to the signal supplied to the amplifier 54 negative terminal. This provides effective cancellation. The choice of the size of the components to affect this cancellation is well within the skill of those in the art.

A voice signal applied to terminals 18 and 20 is applied to balanced input voltage amplifier 54. The amplifier 54 provides an output signal to terminal 14. The output of amplifier 54 is also applied to detector 118. Effective blocking of this signal by detector 118 is provided by the combination of diodes 126 and 128, and zener diodes 122 and 124 within the circuit. The voice signal applied to terminals 18 and 20 is blocked from appearing at terminal 10 by drivers 24, 27 and 72 which inherently provide a high impedance in the reverse direction.

A low frequency ringing signal applied to terminals 18 and 20 is conducted to amplifier 54. The output signal from amplifier 54 depending on instantaneous phase passes through one of respective diodes 126 or 128. The signal is of sufficient strength to cause a breakdown in zeners 122 and 124, thereby applying a signal to amplifier 120. The output of amplifier 120 causes a breakdown of zener diode 144 causing a fixed voltage to appear on terminal 136. This voltage can then be applied to whatever signalling system is chosen. The ringing signal being of low frequency is effectively blocked from appearing at terminal 14 by capacitor 114 which is chosen to have a high impedance at the ringing frequency. In a similar manner the ringing signal is blocked from appearing on terminal 10 by capacitors 52, 62 and 86. Capacitors 56, 58, 64 and 66, however, are chosen to provide passage for the ringing signal.

There has therefore been described a transformless hybrid system for use in conjunction with a 20 Hz ringdown signal. Conventional components are used throughout the system.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A 20 Hz ringdown solid state two-wire/four-wire converter system comprising:
    four-wire input terminals, four-wire output terminals and a pair of two-wire input/output terminals;
    an inverting solid state constant current driver and a non-inverting solid state constant current driver, said drivers in combination connected to transmit and balance a signal from said four-wire input terminals to said two-wire input/output terminals;
    balancing means for use in inhibiting signals from said four-wire input terminals from appearing at said four-wire output terminals, said balancing means connected to said four-wire input terminals;
    amplifier means connected at its input to said inverting constant current driver, said non-inverting constant current driver, said balancing means and said pair of two-wire input/output terminals for transmitting signals originating in the converter system at said two-wire input/output terminals and for inhibiting signals originating in the converter system at said four-wire input terminals;
    threshold detector means connected to the output of said amplifier means for conducting 20 Hz ringdown signals and rejecting other signals transmitted by said amplifier means; and
    said four-wire output terminals connected to said output of said amplifier means for receiving said other signals from said amplifier means.

2. A 20 Hz ringdown solid state two-wire/four-wire converter system according to claim 1 wherein said balancing means further comprises:
    a constant current amplifier having an input connected to said four-wire input terminals; and
    a balancing network connected to the output of said constant current amplifier.

3. A 20 Hz ringdown solid state two-wire/four-wire converter system according to claim 2 wherein each of said inverting solid state constant current driver, non-inverting solid state current driver, constant current amplifier and amplifier means comprises an operational amplifier.

4. A 20 Hz ringdown solid state two-wire/four-wire converter system according to claim 3 wherein said threshold detector means further comprises
    a pair of oppositely biased diodes respectively connected to the output of said amplifier means;
    a pair of oppositely biased zener diodes respectively connected to said diodes;
    an operational amplifier having a pair of input terminals respectively connected to said zener diodes;
    adaptive means adapted for connecting a D.C. bias to one of said operational amplifier input terminals;
    connecting means having a pair of resistors for grounding each of said operational input terminals through one of said pairs of resistors; and
    output means having an output terminal connected to the output of said operational amplifier, said output means further having a zener diode and a capacitor each respectively connecting said operational amplifier output with ground.

* * * * *